US010694328B2

United States Patent
Engelen et al.

(10) Patent No.: US 10,694,328 B2
(45) Date of Patent: Jun. 23, 2020

(54) METHOD OF LOCATING A MOBILE DEVICE IN A GROUP OF MOBILE DEVICES

(71) Applicant: SIGNIFY HOLDING B.V., Eindhoven (NL)

(72) Inventors: Dirk Valentinus René Engelen, Heusden-Zolder (BE); Bartel Marinus Van De Sluis, Eindhoven (NL); Frederik Jan De Bruijn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/330,882

(22) PCT Filed: Aug. 30, 2017

(86) PCT No.: PCT/EP2017/071786
§ 371 (c)(1),
(2) Date: Mar. 6, 2019

(87) PCT Pub. No.: WO2018/046375
PCT Pub. Date: Mar. 15, 2018

(65) Prior Publication Data
US 2019/0215654 A1 Jul. 11, 2019

(30) Foreign Application Priority Data
Sep. 6, 2016 (EP) ..................... 16187395

(51) Int. Cl.
*H05B 45/10* (2020.01)
*H05B 47/155* (2020.01)
(Continued)

(52) U.S. Cl.
CPC ........ *H04W 4/023* (2013.01); *G06K 9/00664* (2013.01); *G06K 9/00825* (2013.01);
(Continued)

(58) Field of Classification Search
CPC combination set(s) only.
See application file for complete search history.

(56) References Cited

U.S. PATENT DOCUMENTS

2009/0110405 A1* 4/2009 Lee .................... H04B 10/1143
398/130
2012/0034934 A1 2/2012 Loveland et al.
(Continued)

FOREIGN PATENT DOCUMENTS

EP 2590116 A2 5/2013
WO 2016088006 A1 6/2016

OTHER PUBLICATIONS

Giorgio Corbellini et al.,"Connecting Networks of Toys and Smartphones With Visible Light Communication," Visible Light Communications, IEEE Communications Magazine, IEEE Service Center, vol. 52, No. 7, Jul. 2014 (7 Pages).
(Continued)

*Primary Examiner* — Omar S Ismail
(74) *Attorney, Agent, or Firm* — Meenakshy Chakravorty

(57) ABSTRACT

A method (800) of locating a mobile device in a group of mobile devices is disclosed. The method comprises transmitting (802) a request message defining a code, receiving (804) the request message, driving (806) a light source of a light emitting mobile device such that it emits light being coded according to the code, detecting (808), by a light receiving device, the light emitted by the light source, retrieving (810) the code from the light, identifying (812) the light emitting mobile device based on the code, and providing (814) an indicator on the light receiving mobile device, the indicator indicating the location of the light emitting mobile device.

12 Claims, 8 Drawing Sheets

(51) Int. Cl.
*H04W 4/02* (2018.01)
*G06K 9/20* (2006.01)
*G06K 9/00* (2006.01)
*H05B 47/19* (2020.01)

(52) U.S. Cl.
CPC .......... *G06K 9/2027* (2013.01); *H05B 45/10* (2020.01); *H05B 47/155* (2020.01); *H05B 47/19* (2020.01)

(56) References Cited

U.S. PATENT DOCUMENTS

| | | | | |
|---|---|---|---|---|
| 2012/0045215 | A1* | 2/2012 | Kim | H04B 10/116 398/128 |
| 2013/0183042 | A1* | 7/2013 | Knapp | H04L 12/2838 398/106 |
| 2013/0200806 | A1* | 8/2013 | Chobot | H05B 47/19 315/151 |
| 2014/0132390 | A1 | 5/2014 | Loveland et al. | |
| 2015/0147067 | A1* | 5/2015 | Ryan | H04L 67/12 398/118 |
| 2016/0249164 | A1* | 8/2016 | Jovicic | H04W 4/023 |
| 2016/0286227 | A1* | 9/2016 | Miyamoto | H04B 10/50 |
| 2018/0376570 | A1* | 12/2018 | Verbrugh | G01C 21/206 |

OTHER PUBLICATIONS

Hong Wei et al., "Line-Of-Sight Signaling and Positioning for Mobile Devices," 2013 IEEE International Conference on Multimedia and Expo Workshops, IEEE, Jul. 2013 (6 Pages).

Yu Zeng et al.,"Visible Light Communication System for Mobile Device," 2014 Sixth International Conference on Ubiquitous and Future Networks, IEEE, Jul. 2014 (3 Pages).

Gordon Povey, "Visible Light Communication Is an Ideal Technology to Enable Augmented Reality Applications for Indoor Environments," Retrieved From Internet: http://visiblelightcomm.com/augmented-reality-using-vlc on Mar. 11, 2015 (4 Pages).

Sarah Griffiths, "Never Lose a Friend in the Crowd Again! App Transforms Phones Into Attention Grabbing Flashing Beacons of Light," www.dailymail.co.uk/sciencetech/article-2950933/never-lose-friend-crowd-app-transforms-phones-attention-grabbing-flashing-beacons-light, Feb. 2015 (4 Pages).

* cited by examiner

100

METHOD OF LOCATING A MOBILE DEVICE IN A GROUP OF MOBILE DEVICES

CROSS-REFERENCE TO PRIOR APPLICATIONS

This application is the U.S. National Phase application under 35 U.S.C. § 371 of International Application No. PCT/EP2017/071786, filed on Aug. 30, 2017, which claims the benefit of European Patent Application No. 16187395.5, filed on Sep. 6, 2016. These applications are hereby incorporated by reference herein.

FIELD OF THE INVENTION

The invention relates to a method of locating a mobile device in a group of mobile devices.

BACKGROUND

Finding a friend in a crowd of people at an event, for example a concert, can be difficult. Typically, people send text messages to each other trying to explain their whereabouts in order to find each other. Online publication "Never lose a friend in the crowd again! App transforms phones into attention grabbing flashing beacons of light, 12 Feb. 2015—http://www.dailymail.co.uk/sciencetech/article-2950933/Never-lose-friend-crowd-App-transforms-phones-attention-grabbing-flashing-beacons-light.html)" discloses an application which enables a user to select a color on a display of a mobile device, whereupon the display of the mobile device starts flashing according to that color. The user may send a message to another user instructing that other user to look for that specific color.

Alternatively people may use (indoor) positioning applications on their mobile devices to find each other. A disadvantage of explaining one's whereabouts or the use of (indoor) positioning systems is that these methods are often inaccurate and prone to errors (either human error or system errors). Therefore, there is a need for an accurate and error proof method for a person to find another person in a crowd.

European patent application EP 2590116 A2 discloses a mobile device for use in determining a location of a component of a system, which includes a communication interface configured to transmit at least one signal to the component, a display, and a processor coupled to the communication interface and to the display. The processor is programmed to display a representation of the system on the display, display an expected location of the component within the representation, and transmit the at least one signal to the component using the communication interface for use in determining an actual location of the component. The system component may transmit a response message to the mobile device such that the response message operates as a beacon for mobile device. The response message may include a timestamp and/or GPS data to facilitate enabling the mobile device to locate and/or determine the location of system component. The processor of the component may also activate a light source and/or an audio source to generate a visual and/or audio beacon or notification to facilitate locating system component. The processor of the mobile device may updates the model with the actual location of system component.

SUMMARY OF THE INVENTION

It is an object of the present invention to provide an accurate and error proof way for a person to find another person in a crowd.

According to a first aspect of the present invention, the object is achieved by a method of locating a mobile device (e.g. in a group of mobile devices), the method comprising:
   transmitting a request message defining a code, (by a first mobile device)
   receiving the request message, (by a second mobile device)
   driving a light source of a light emitting mobile device such that it emits light being coded according to the code, (the light emitting mobile device may be one of the first and second mobile devices)
   detecting, by a light receiving mobile device, the light emitted by the light source, (the light receiving mobile device may be the other of the first and second mobile devices)
   retrieving the code from the light, (by the light receiving mobile device)
   identifying the light emitting mobile device based on the code, (by the light receiving mobile device) and
   providing an indicator on the light receiving mobile device, the indicator indicating the location of the light emitting mobile device.

Both the light emitting mobile device and the light receiving mobile device have access to the request message defining the code. Therefore, the light emitting mobile device is able to drive the light source such that it emits light being coded according to the code, and the light receiving mobile device is able to retrieve and recognize the code from the light emitted by the light emitting mobile device. This enables the receiving device to distinguish the code from a plurality of other codes (which may, for example, be emitted by a plurality of light emitting mobile devices). An indicator indicating the location of the light emitting mobile device is provided on the light receiving mobile device (e.g. a virtual representation of the light emitting mobile device rendered on a display of the light receiving mobile device). Thus, a user operating the light receiving mobile device is able to see the location of the light emitting mobile device in a group of mobile devices. This enables the user to locate/find another user operating the light emitting mobile device in a group of people. This method provides the advantage that the user operating the light receiving mobile device can see the location provided by the indicator. Moreover, the user may be able to directly see the light source emitting the code and thereby see the location of the light emitting mobile device in reality.

In embodiments of the method, the step of transmitting the request message defining the code is executed by the light receiving mobile device, and the step of receiving the request message is executed by the light emitting mobile device (the light receiving mobile device may be the first mobile device and the light emitting mobile device is the second mobile device). This embodiment enables a user operating the light receiving mobile device (the first mobile device) to transmit the request message to the light emitting mobile device (the second mobile device), whereupon the light emitting mobile device receives the request message and emits light being coded according to the code. This is advantageous because it enables a first user operating a first mobile device to request a second user operating a second mobile device to emit, by the second mobile device, the light being coded according to the code. As a result, the first user will be able to find the second user in a crowd by 'scanning' the crowd (i.e. pointing a light sensor of the first mobile towards the crowd).

In embodiments of the method, the step of transmitting the request message defining the code is executed by the light emitting mobile device, and the step of receiving the request message is executed by the light receiving mobile device (the light emitting mobile device may be the first mobile device and the light receiving mobile device is the second mobile device). This embodiment enables a user operating the light emitting device (the first mobile device) to transmit the request message to the light receiving mobile device (the second mobile device), whereupon the light receiving mobile device receives the request message and is able to detect light being coded according to the code. This is advantageous because it enables a first user operating a first mobile device (which transmits the request message and the light being coded according to the code) to request a second user operating a second mobile device (which receives the light) to search for the first mobile device. As a result, the first user will be able to ask/prompt the second user to find the first mobile device and therewith the first user in a crowd, whereupon the second user may 'scan' the crowd (i.e. pointing a light sensor of the second mobile towards the crowd).

In embodiments of the method, the step of detecting the light emitted by the light source comprises capturing a stream of images comprising the light emitted by the light source, and the step of retrieving the code from the light comprises retrieving the code from the light in the stream of images. The advantage of capturing the stream of images for detecting the light, for example by an image capture device such as a camera, is that a plurality of light sources emitting codes can be detected and analyzed simultaneously in order to identify the light source which emits light being coded according to the code. Another advantage of using an image capture device for detecting the light is that many mobile devices are already equipped with one or more cameras, thereby reducing the need for installing a dedicated light sensor for detecting the light.

In embodiments of the method, the step of providing the indicator indicating the location of the light emitting mobile device comprises displaying the stream of images and a virtual indicator indicating the location of the light emitting mobile device. As a result, the user operating the light receiving mobile device can see the physical, real-world environment augmented by the virtual indicator. This is beneficial, because the user can simply look at, for example, a display of the light receiving mobile device while he is scanning the crowd for the light emitting mobile device whereupon the indicator is provided as an overlay on top of the displayed physical, real-world environment.

In an alternative embodiment of the method, the light receiving mobile device may be smart glasses. The stream of images and the virtual indicator may be provided via the smart glasses, or only the virtual indicator may be provided to the user wearing the smart glasses, thereby indicating the location of the light emitting mobile device. In the latter case only the virtual indicator would be displayed, which would remove the need to display the stream of images.

In further embodiments of the method, the capturing of the stream of images comprises capturing a first stream of images received from a first direction by a first image capture means, and capturing a second stream of images received from a second direction by a second image capture means, wherein the first and/or the second stream of images comprises the light emitted by the light source. This embodiment is beneficial when the light receiving mobile device comprises multiple image capture means, for example a front-facing camera and a rear-facing camera. This enables the light receiving mobile device to detect the light being coded according to the code faster.

In embodiments of the method, the code is a unique sequence of bits. It is beneficial to use unique codes, because it removes the chance of multiple mobile devices accidentally emitting the same code.

In embodiments of the method, temporally synchronized light-code-transmission and -reception can be used. The synchronization can be based on a time-stamp that is transmitted as part of the transmission request. The time stamp defines exactly when the transmission takes place, such that the light receiving mobile device exactly knows when to expect which code or code fragment to expect. This temporal synchronization can be based on a common time reference, which can be, but is not limited to, a time reference of the mobile (e.g. 4G) network, a time reference shared in a Wi-Fi network, or a time reference of a GPS network, the last of which potentially provides most accuracy. Such networked temporal signal synchronization is already found in networked (home) sound systems where accurate time synchronization between multiple speakers is vital for correct multichannel sound reproduction. The use of synchronized transmission and detection has the advantage that code transmission can be achieved with less overhead. In case the same synchronized transmission instances are used for all light emitting mobile devices it can also have the advantage that the emitted codes can be mutually orthogonal, such that unambiguous detection is possible in the case of spatially overlapping signals (such spatially overlapping signals typically occur when a detecting camera is purposely adjusted to capture out-of-focus images, which intentional defocus typically benefits the detection of coded light with a rolling-shutter imaging sensor). Repetitive transmission of new time-stamps may take place to ensure continued synchronization during transmission.

In embodiments of the method, the code is a randomly generated stream of bits, and the light emitting device and the light receiving device both have access to the generated stream of bits so as to respectively drive the light source and retrieve the code accordingly. In this embodiment, both the light receiving mobile device and the light emitting mobile device know which code fragment or even which code bit is emitted at which time by the light emitting mobile device. This embodiment is advantageous because the randomly generated stream of bits is meaningless to devices which pick up the light being coded according to the code.

In embodiments of the method, an (almost) endless (pseudo-)random bit-stream as a light code may be used, the code to be transmitted can be based on the use of the same random code generator in both the light emitting device and the light receiving device. The particular random code sequence can be based on the so-called 'seed' of the random code generator that is transmitted as part of the request message. This embodiment is advantageous because it is sufficient to only synchronize the light emitting and the light receiving device. Due to the deterministic but random nature of the bit stream, the signal becomes inherently orthogonal to any other temporal signal in the environment, which benefits the robustness of detection.

In embodiments of the method, a randomly generated stream of bits may be used. The bits may be encoded using a DC-free spreading code such as a Manchester code or a Barker code.

In embodiments of the method, the request message further comprises color information representative of a color, and the step of driving the light source of the light emitting mobile device comprises driving the light source such that it emits light according to the color. The color information is presented to and/or selected by the user operating the mobile device that generates the request message. As a result, a user operating the light receiving mobile device knows for which color to look in the crowd, and 'point' the light sensor of the light receiving mobile device only to light sources that emit the color. This makes it even easier for a user to find the light emitting mobile device in the crowd.

In embodiments of the method, the step of driving the light source of the light emitting mobile device further comprises embedding location information indicative of a location of the light emitting mobile device in the code, and the method further comprises the steps of: retrieving, by the light receiving mobile device, the location of the light emitting mobile device from the light emitted by the light source, and providing the location information on the light receiving mobile device. This embodiment is beneficial, because it provides further location information (e.g. position coordinates, an area identifier, a room identifier, etc.) to the user operating the light receiving mobile device, which may enable the user to find the light emitting mobile device even quicker.

In embodiments of the method, the step of driving the light source comprises driving a plurality of light sources oriented in different directions. This embodiment is beneficial, because when driving the plurality of light sources oriented in different directions increases the chance that a light receiving mobile device is able to receive the light being coded according to the code.

In embodiments of the method, the request message is transmitted via a radio frequency protocol. This embodiment is beneficial because many mobile devices are already equipped with communication logic arranged for communicating over a radio frequency (RF) protocol. This therefore removes the need for dedicated communication logic.

In embodiments of the method, the light is visible to the human eye. The light emitted by the light source and being coded according to the code may be visible light. The code may be unperceivable for the human's eye. Alternatively, the light being coded according to the code may be invisible, and an additional light source may emit visible light such that the user is able to see the presence of the light emitting mobile device once the light being coded according to the code has been detected by the light receiving mobile device.

In embodiments of the method, the method further comprises the steps of: retrieving a plurality of codes from the light emitted by a plurality of light sources of a plurality of light emitting mobile devices, identifying, based on the plurality of codes, the plurality of light emitting mobile devices, and providing a plurality of indicators indicating the locations of the plurality of light emitting mobile devices. This embodiment enables a user to see the locations of a plurality of people (e.g. friends).

According to a second aspect of the present invention, the object is achieved by a first mobile device for locating a second mobile device, comprising:
   a first light source,
   a driver for driving the light source,
   a transmitter for transmitting a primary request message to the second mobile device,
   a receiver for receiving a secondary request message transmitted by the second mobile device,
   a light sensor arranged for detecting light,
   optionally a user interface arranged for receiving a user input indicative of a locate request,
   a processor for:
      a. generating the primary request message defining a code,
      b. transmitting the primary request message via the transmitter,
      c. detecting light emitted by a second light source of the second mobile device via the light detector,
      d. retrieving the code from the detected light,
      e. identifying the second mobile device based on the code, and
      f. providing an indicator indicating a location of the second mobile device,
      g. controlling the driver such that the light source emits light being coded according to the code,
   wherein the processor is arranged for activating:
   (i) a first operational mode (optionally upon receiving the user input), wherein the processor executes either steps a-f or steps a, b and g, and
   (ii) a second operational mode, wherein, upon receiving the secondary request message, the processor executes either step g or steps c-f, respectively.

The first mobile device is arranged for communicating with the second mobile device so as to inform one of the users of the first or second mobile device about the location of the other. This can be achieved by two different approaches, which apply the same inventive concept of the invention.

In a first approach, the processor may be arranged for activating:
(i) a first operational mode (optionally upon receiving the user input), wherein the processor is arranged for executing the steps of:
   a. generating the primary request message defining a code,
   b. transmitting the primary request message via the transmitter,
   c. detecting light emitted by a second light source of the second mobile device via the light sensor,
   d. retrieving the code from the detected light,
   e. identifying the second mobile device based on the code, and
   f. providing an indicator indicating a location of the second mobile device, and
(ii) a second operational mode, wherein, upon receiving the request message, the processor is arranged for executing the steps of:
   g. controlling the driver such that the light source emits light being coded according to the code.

This first approach enables a user operating the first mobile device to, for example, provide a user input indicative of the locate request, whereupon the first mobile device transmits the request message to the second mobile device, whereupon the second mobile device receives the request message and emits light being coded according to the code. This enables the user to request another user operating the second mobile device to emit, by the second mobile device, the light being coded according to the code. As a result, the user will be able to find the other user in a crowd by 'scanning' the crowd (i.e. pointing a light sensor of the first mobile towards the crowd). Additionally, this first approach enables the user operating the first mobile device to receive a request message from a second mobile device, whereupon the driver is controlled such that the light source emits light being coded according to the code. As a result, the user operating the first mobile device can be found by another user operating the second mobile device.

In a second approach, the processor may be arranged for activating:
(i) a first operational mode (optionally upon receiving the user input), wherein the processor is arranged for executing the steps of:

a. generating the primary request message defining a code, b. transmitting the primary request message via the transmitter, g. controlling the driver such that the light source emits light being coded according to the code, and (ii) a second operational mode, wherein, upon receiving the request message, the processor is arranged for executing the steps of:

c. detecting light emitted by a second light source of the second mobile device via the light sensor, d. retrieving the code from the detected light, e. identifying the second mobile device based on the code, f. providing an indicator indicating a location of the second mobile, and g. controlling the driver such that the light source emits light being coded according to the code.

This second approach enables a user operating the first mobile device to, for example, provide a user input indicative of the locate request, whereupon the first mobile device transmits the request message to the second mobile device and emits light being coded according to the code. The second mobile device receives the request message and is able to detect light being coded according to the code. This is advantageous because it enables the user operating the first mobile device (which transmits the request message and the light being coded according to the code) to request another user operating the second mobile device (which receives the light) to search for the first mobile device. As a result, the user will be able to ask/prompt the other user to find the first mobile device in a crowd, whereupon the second user may 'scan' the crowd (i.e. pointing a light sensor of the second mobile towards the crowd). In other words, the user operating the first mobile device can be found by the other user. Additionally, this second approach enables the user operating the first mobile device to receive a request message from a second mobile device, whereupon user may scan the crowd with the first mobile device for the second mobile device which needs to be found.

It should be understood that the claimed mobile devices may further have similar and/or identical embodiments and advantages as the claimed methods.

BRIEF DESCRIPTION OF THE DRAWINGS

The above, as well as additional objects, features and advantages of the disclosed mobile devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
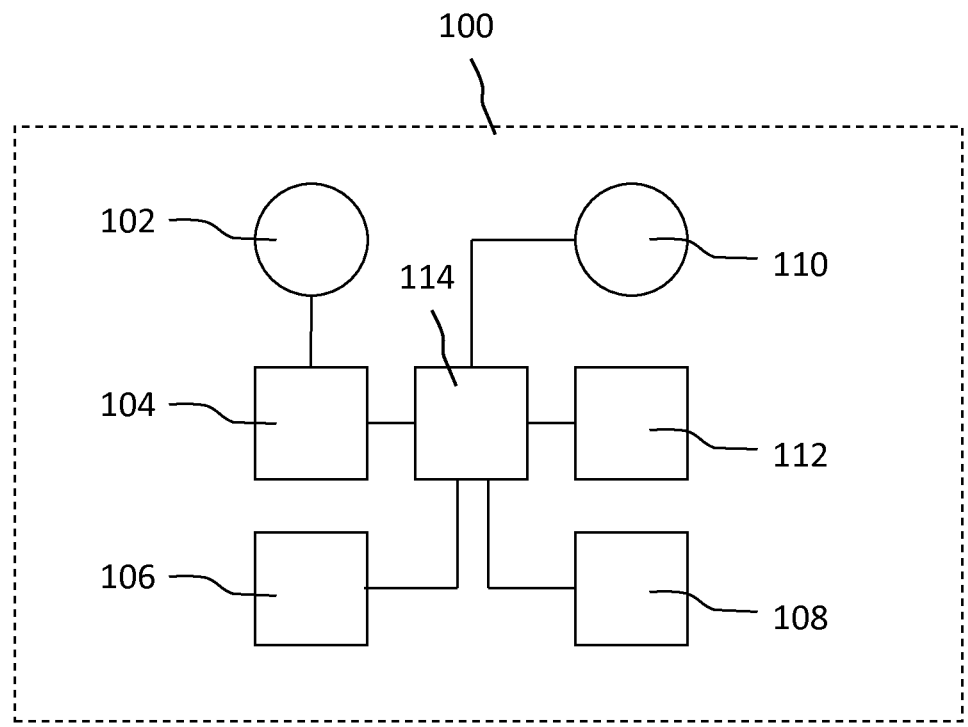
FIG. 1 shows schematically an embodiment of a mobile device according to the invention for locating another mobile device in a group of mobile devices.

FIG. 1 shows schematically an embodiment of a first mobile device 100 according to the invention for locating a second mobile device in a group of mobile devices, or to be located by a second mobile device in a group of mobile devices. The first mobile device comprises a first light source 102, a driver 104 for driving the light source 102, a receiver 106 (for receiving a secondary request message transmitted by the second mobile device), a transmitter 108 (for transmitting a primary request message to the second mobile device), a light sensor 110 arranged for detecting light and a processor 114 (e.g. a microchip, circuitry, a microcontroller, etc.), and, optionally, a user interface 112 arranged for receiving a user input indicative of a locate request. The processor 114 is arranged for generating a (primary) request message defining a code, transmitting the (primary) request message via the transmitter, detecting light emitted by a second light source of a second mobile device via the light sensor, retrieving the code from the detected light, identifying the second mobile device based on the code, providing an indicator indicating a location of the second mobile device (e.g. a circle, an arrow, text, an image, a video, etc. indicating the location of the second mobile device) and controlling the driver such that the light source emits light being coded according to the code.

The processor 114 is further arranged for activating a first operational mode (for example upon receiving the user input) and a second operational mode upon receiving the request secondary message from a second mobile device. In the first operational mode the first mobile device 100 can be seen as the requester and in the second operational mode the first mobile device 100 can be seen as the responder (to a locate request from another mobile device).

It should be understood that the secondary request message (received by a first mobile device) may be same the primary request message (transmitted by a second mobile device) and vice versa, and therefore both are henceforth referred to as 'request message'.

The first mobile device 100 may be any type of portable or wearable device. Examples of a mobile devices include but are not limited to smartphones, tablet pcs, cameras, smart watches, bracelets, smart glasses, smart rings, virtual reality (VR) glasses, augmented reality (AR) glasses, etc.

The first mobile device 100 is arranged for communicating with a second mobile device so as to inform one of the users of the first or second mobile device about the location of the other. This can be achieved by two different approaches, which use the same inventive concept of the invention. In a first approach, henceforth referred to as the 'where-are-you' approach, the first mobile device 100 requests a second mobile device to emit the light being coded according to the code, whereupon the first mobile device 100 can detect the light and inform the user operating the first mobile device 100 about the location of the second mobile device. In a second approach, henceforth referred to as the 'find-me' approach, the first mobile device 100 requests a second mobile device to find it by transmitting the request code and emitting the light, whereupon the second mobile device can detect the light and inform the user operating the second mobile device about the location of the first mobile device 100. Both approaches will be explained in detail while referring to FIGS. 2 and 3.

Figure 2:
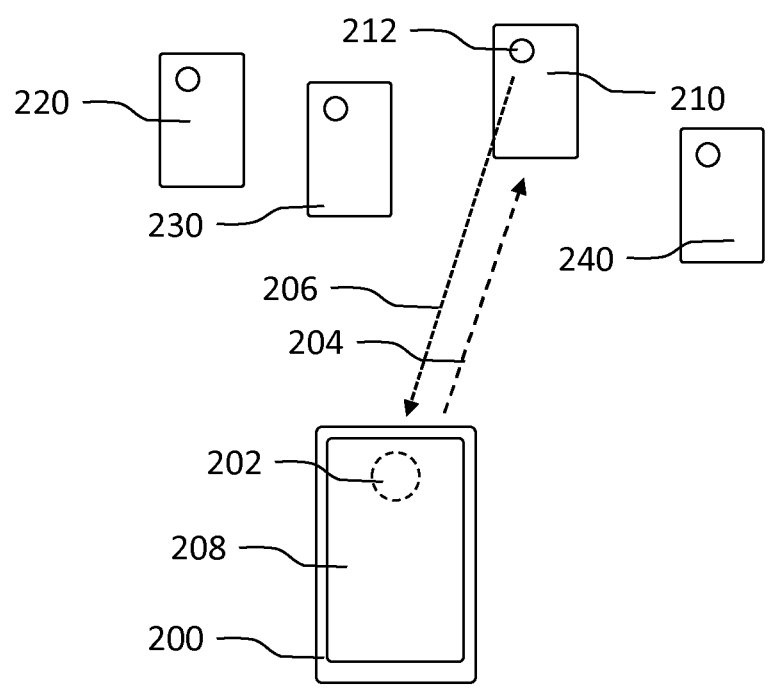
FIG. 2 shows schematically an embodiment of a mobile device according to the invention for locating another mobile device in a group of mobile devices.

FIG. 2 shows schematically an embodiment of a mobile device 200 according to the invention for locating a second mobile 210 device in a group of mobile devices 210, 220, 230, 240. FIG. 2 illustrates the above-mentioned 'where-are-you' approach, because it enables the user operating the first mobile device 200 to request the location of the second mobile device 210. A user may provide a user input indicative of a locate request (a 'where-are-you' request), whereupon a processor (not shown) of the first mobile device 200 activates the first operational mode wherein it generates the request message 204. The request message 204 defines a code. The processor is coupled to the transmitter (not shown), and the processor transmits the request message to the second mobile device 210. Upon receiving the request message 204, a processor (not shown) of the second mobile device 210 activates the second operational mode, whereupon it controls a driver (not shown) of the second mobile device 210 such that a (second) light source 212 of the second mobile device 210 emits light 206 being coded according to the code. The user operating the second mobile device 210 receives a notification indicating that someone is looking for him or her, and the processor may render a message on a user interface to request the user to hold the second mobile device 210 up in the air such that a line of sight between the first mobile device 200 and the second mobile device 210 can be established. Because the light 206 is coded according to the code, the first mobile device 200 is able to recognize the code embedded in the light 206. The processor of the first mobile device 200 is further coupled to the light sensor 202, which light sensor 202 detects the light 206 being coded according to the code. The processor of the first mobile device 200 then retrieves the code from the light 206 and identifies the second mobile device 210 based thereon. Upon identifying and locating the second mobile device 210, the processor of the first mobile device 200 provides an indicator indicating a location of the second mobile device 210 (e.g. via the user interface). As a result, the user operating the first mobile device 200 is able to see the location of the user operating the second mobile device 210 amongst the group of mobile devices 210, 220, 230, 240.

Figure 3:
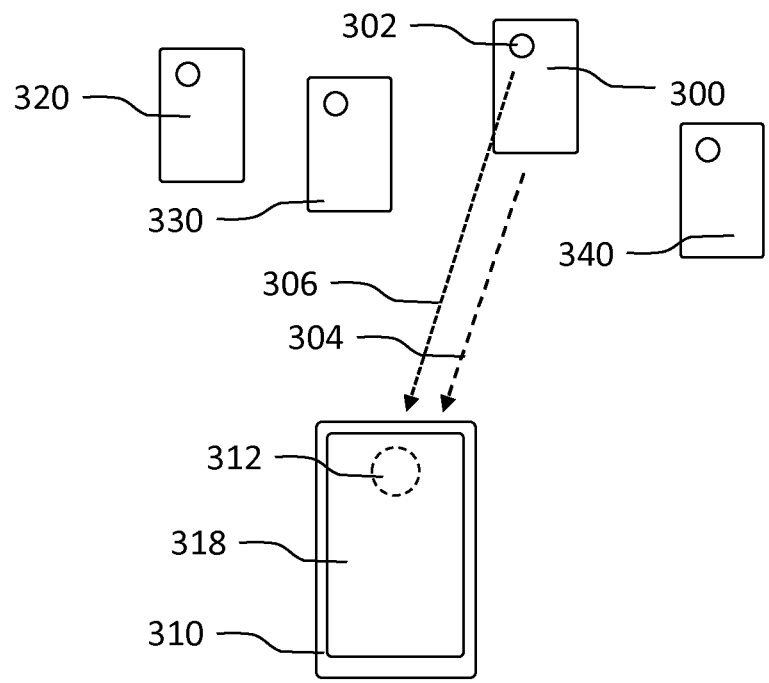
FIG. 3 shows schematically an embodiment of a mobile device according to the invention which can be located by another mobile device in a group of mobile devices.

FIG. 3 shows schematically an embodiment of a mobile device 300 according to the invention which can be located by a second mobile device 310 in a group of mobile devices 300, 320, 330, 340. FIG. 3 illustrates the above-mentioned 'find-me' approach, because it enables the user operating the first mobile device 300 to request the second mobile device 310 to find the first mobile device 300. A user may provide a user input indicative of a locate request (a 'find-me' request), whereupon the processor (not shown) activates the first operational mode wherein it generates the request message 304. The request message 304 defines a code. The processor is coupled to the transmitter (not shown), and the processor transmits the request message to the second mobile device 310. The processor is further coupled to a driver (not shown) and the driver is arranged for driving a light source 302. The processor is further arranged for controlling the driver such that that the light source 302 emits light 306 being coded according to the code. Upon receiving the request message 304, a processor (not shown) of the second mobile device 310 activates the second operational mode. The user operating the second mobile device 310 may receive a notification indicating that someone is looking for him or her, and the processor may render a message on a user interface 318 to request the user to hold the second mobile device 310 up in the air such that a line of sight between the first mobile device 300 and the second mobile device 310 can be established. In the second operational mode, a light sensor 312 detects the light 306. Because the light 306 is coded according to the code, the second mobile device 310 is able to recognize the code embedded in the light 306. The processor of the second mobile device 310 may then retrieve the code from the light 306 and identify the first mobile device 300 based thereon. Upon identifying and locating the first mobile device 300, the processor of the second mobile device 310 may provide an indicator indicating a location of the first mobile device 300 (e.g. via the user interface). As a result, the user operating the second mobile device 310 is able to see the location of the user operating the first mobile device 300 amongst the group of mobile devices 300, 320, 330, 340.

The first mobile device 100 comprises one or more light sources 102 for emitting light, and the driver 104 for driving the one or more light sources 102, such as LED or OLED light sources, such that the emitted light is coded according to the code. The coding may be created by any known principle of embedding a code in light, for example by controlling a time-varying, modulated current to the one or more light sources 102 to produce variations in the light output, by modulating the color, intensity and/or duty cycle of the light, etc. Alternatively, the light source may be comprised in a connected device, for example a wearable device such as a bracelet or glasses which comprise the light source. The connected device may be connected to the first mobile device 100, which enables the first mobile device (e.g. a smartphone) to communicate the code to the connected device which in turn may emit the light being coded according to the code.

The one or more light sources 102 may, for example, be the flash of a camera comprised in a smart phone. Using the flash to emit light comprising the code is beneficial because most mobile smart devices are already equipped with a flash. Alternatively, the one or more light sources 102 may be arranged as a display arranged for displaying content to a user. The light sources of the display may be controlled collectively or individually so as to emit light comprising the code. Alternatively, the one or more light sources 102 may be arranged as a display backlight. The light sources of the backlight may be controlled collectively or individually so as to emit light comprising the code. It should be noted that the above-mentioned types of light sources illustrate rather than limit the invention, and that those skilled in the art will be able to design many alternative embodiments without departing from the scope of the appended claims.

The first mobile device 100 may comprise a plurality of light sources oriented in different directions (e.g. up, down, left, right, forward, backward), each arranged for emitting light being coded according to the code comprised in the request message. The first mobile device may, for example, comprise a front-facing display and a rear-facing flash light, or a front-facing display and a rear-facing display, a front-facing flash and a side-facing indicator light, etc., which all may emit light being coded according to the code. This increases the chance that a light receiving mobile device is able to receive the light being coded according to the code embedded in the light.

The one or more light sources 102 may be arranged for emitting light visible to the human eye. The light emitted by the one or more light sources 102 and being coded according to the code may be visible light. The code may be unperceivable for the human's eye. Alternatively, the light being coded according to the code may be invisible, and an additional light source may emit visible light such that the user is able to see the presence of the light emitting mobile device once the light being coded according to the code has been detected by the light receiving mobile device.

The light source 102 may be arranged for emitting colored light. The request message may further comprise color information representative of a color that is to be emitted by a light emitting mobile device. The driver 104 may be arranged for driving the light source 102 such that it emits light according to the color (e.g. green) as defined by the request message. As a result, a user operating a light receiving mobile device knows for which color to look in the crowd, and 'point' the light sensor of the light receiving mobile device only to light sources that emit the color. This makes it even easier for a user to find the light emitting mobile device in the crowd.

The first mobile device 100 further comprises a transmitter 108 and a receiver 106 for respectively transmitting the request message to and/or receiving the request message from the second mobile device. The first mobile device 100 may transmit and/or receive the request message to/from the second mobile device via any communication protocol. The first and second mobile device may be able to communicate via a direct communication link, for example via Bluetooth, ZigBee, Wi-Fi, etc., and/or the first and second mobile device may be able to communicate via an indirect communication link, for example via a server and/or via the internet. In embodiments, the processor of the first mobile device 100 may be able to switch between a direct communication link and an indirect communication link depending on, for example, the signal strength/reception of either one.

The first mobile device 100 further comprises a light sensor 110 arranged for detecting light comprising the embedded code. The light sensor 110 may be any type of sensor arranged for detecting light and the code embedded in the light. The light sensor 110 may, for example be a rolling shutter camera, a global shutter camera, a photo sensor such as a photodiode, photo transistor or photovoltaic sensor, etc.

The first mobile device 100 further comprises a user interface 112 arranged for receiving a user input indicative of a locate request. A user operating the first mobile device 100 may provide the user input. The user interface 114 may for example comprise a touch-sensitive device such as a touchpad, a touchscreen, one or more buttons and/or one or more sliders for receiving touch input, a microphone for receiving voice commands, an accelerometer and/or a gyroscope for detecting motion as the user input, etc. A first user may, for example, open an application on the first mobile device 100, which application may provide a list of other people to whom the request message may be sent. The first user may select one of the other users, whereupon the processor 114 of the first mobile device 100 generates and transmits the request message. A second user operating a second mobile device may accept the request message. Optionally, the second mobile device may transmit a response message to the first mobile device, which response message is indicative of that the second user has accepted the request. Response message may inform the first user that the second user is willing to be found/willing to find the first user. Either the first mobile device or the second mobile device may then emit light being coded according to the code as defined by the request message, enabling the light receiving mobile device to identify the light emitting mobile device.

The light sensor 110 of the first mobile device 100 may be an image capture device such as a camera. The image capture device may be arranged for capturing a stream of images comprising the light emitted by the light source 102. The processor 114 may be further arranged for retrieving the code embedded in the light from the light in the stream of images. The processor may use any of the image analysis techniques known in the art to retrieve the code from the stream of images.

The image capture device may be arranged to adjust optical focus in a fashion that benefits the detection of the embedded light code from the stream of images. For example, an intentional out-of-focus setting causes small bright light sources to be imaged as disks (the so-called bokeh-effect). When acquired with a rolling-shutter sensor, the coded light signal causes the associated bokeh-disks to exhibit an intensity pattern that corresponds with the value of the coded-light signal. The stronger the deviation from sharp focus, the larger the bokeh disks, and the larger the extent of the signal fragment inside the disk. The disks of spatially adjacent encoded light sources will partially blend into each other such that the associated coded light signals will accumulate and result in the summed pattern associated with the different coded light signals. The separation into the separate codes can benefit from the mutual orthogonality of the stacked signals as described earlier. In case multiple devices are arranged to synchronously emit light comprising the same code, the adjacency of the multiple light emitting mobile devices within the camera frame of a light receiving mobile device, under said defocus, will similarly accumulate in the associated bokeh disks, benefiting the detection by a light receiving mobile device. The bokeh circle remains accurately centered around the position of the light emitting mobile device within the camera frame. By extracting the circle center from the bokeh disk the position of the light emitting mobile device can be recovered at sub-pixel accuracy within the camera frame. This may benefit the accurate localization of the light emitting mobile device from a low-resolution camera frame and the use of this location to extract a picture of the light emitting mobile device in a high-resolution camera frame acquired with the same or with a different camera.

The first mobile device 100 may comprise a plurality of image capture means, each arranged for capturing an individual stream of images. The first mobile device 100 (e.g. a smartphone) may, for example, comprise a front-facing camera and a rear-facing camera. This increases the coverage area of the first mobile device 100, which is beneficial because it enables faster detection of the light. Alternatively, the first mobile device 100 (e.g. a smartphone) may be connected to another device (e.g. a smart watch), which other device comprises the light sensor (such as an image capture means). In embodiments, both the first mobile device 100 and the other device may both comprise light sensors. Alternatively, the first mobile device may comprise multiple back-facing cameras; the focus setting of the cameras may be different for each of the cameras such that the result of an out-of-focus coded light signal detection can take place simultaneously with the acquisition of the same scene in proper focus. The properly focused image may be shown on the device display combined with the result of the coded light detection (the location of the second device) superimposed.

Figure 4:
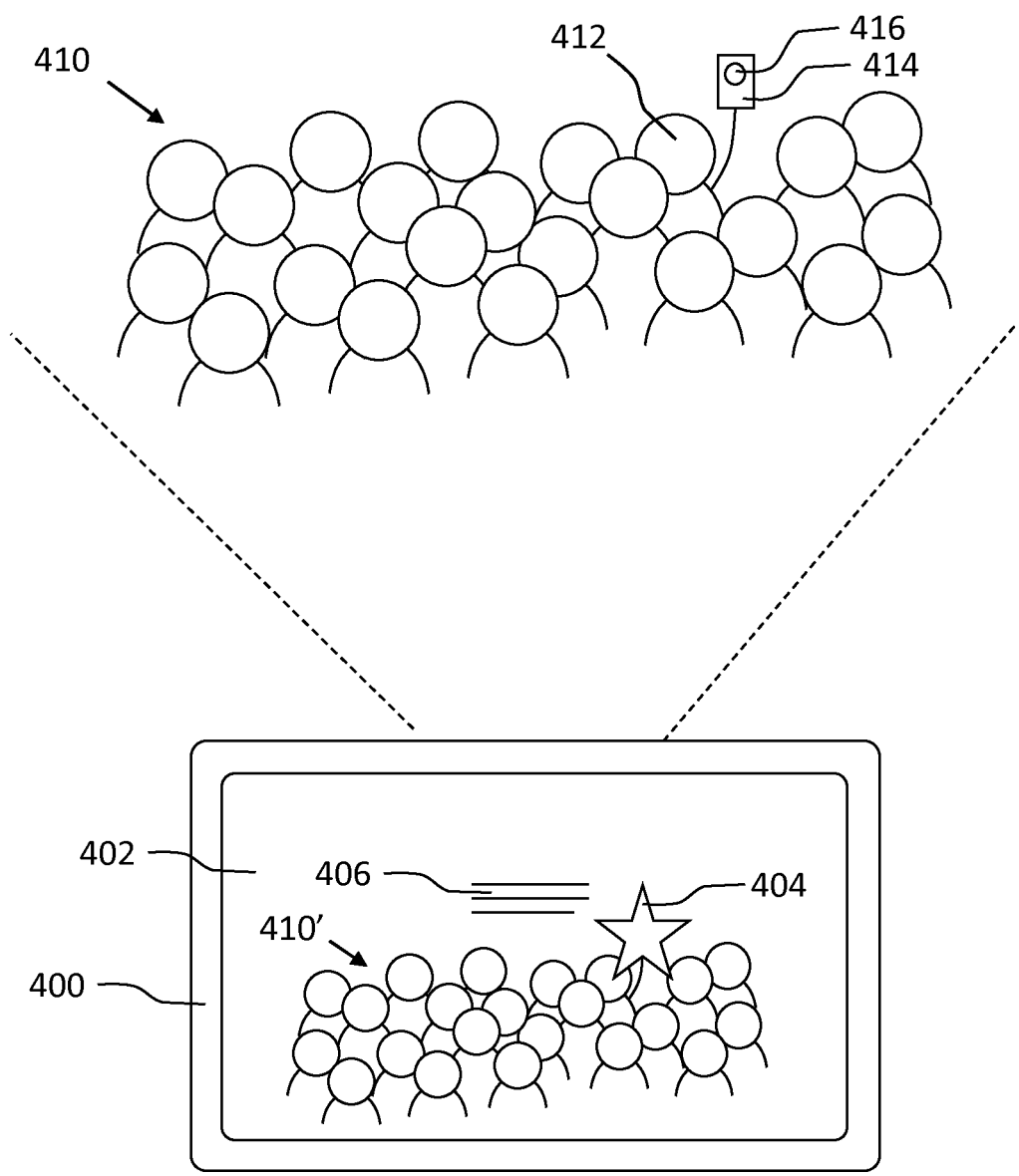
FIG. 4 shows schematically an embodiment of a mobile device according to the invention for displaying a location of another mobile device.

The processor 114 is further arranged for providing an indicator indicating a location of a light emitting mobile device upon identifying the light emitting mobile device. FIG. 4 illustrates an example of such an indicator 404. FIG. 4 shows a first mobile device 400 comprising a camera (not shown) for capturing a stream of images of a crowd 410. A first user operating the first mobile device 400 may provide a user input (for example at touch screen 402) to transmit a request message to a second user 412 operating a second mobile device 414, whereupon the second mobile device 414 may respond by driving a light source 416 to emit light being coded according to a code comprised in the request message. The first user may move the first mobile device 400 to scan the crowd for the light. Once the light source 416 and the camera are in each other's line-of-sight, a processor (not shown) of the first mobile device 400 may retrieve the code from the light and identify the second mobile device 414, whereupon the processor provides an indicator indicating a location of the second mobile device 414. The processor may render the stream of images of the crowd 410' and a virtual indicator 404 indicating the location of the second mobile device 414 on the display 402 of the first mobile device 400. As a result, the first user can see the physical, real-world environment on the display 402 augmented by the virtual indicator 404.

Figure 5:
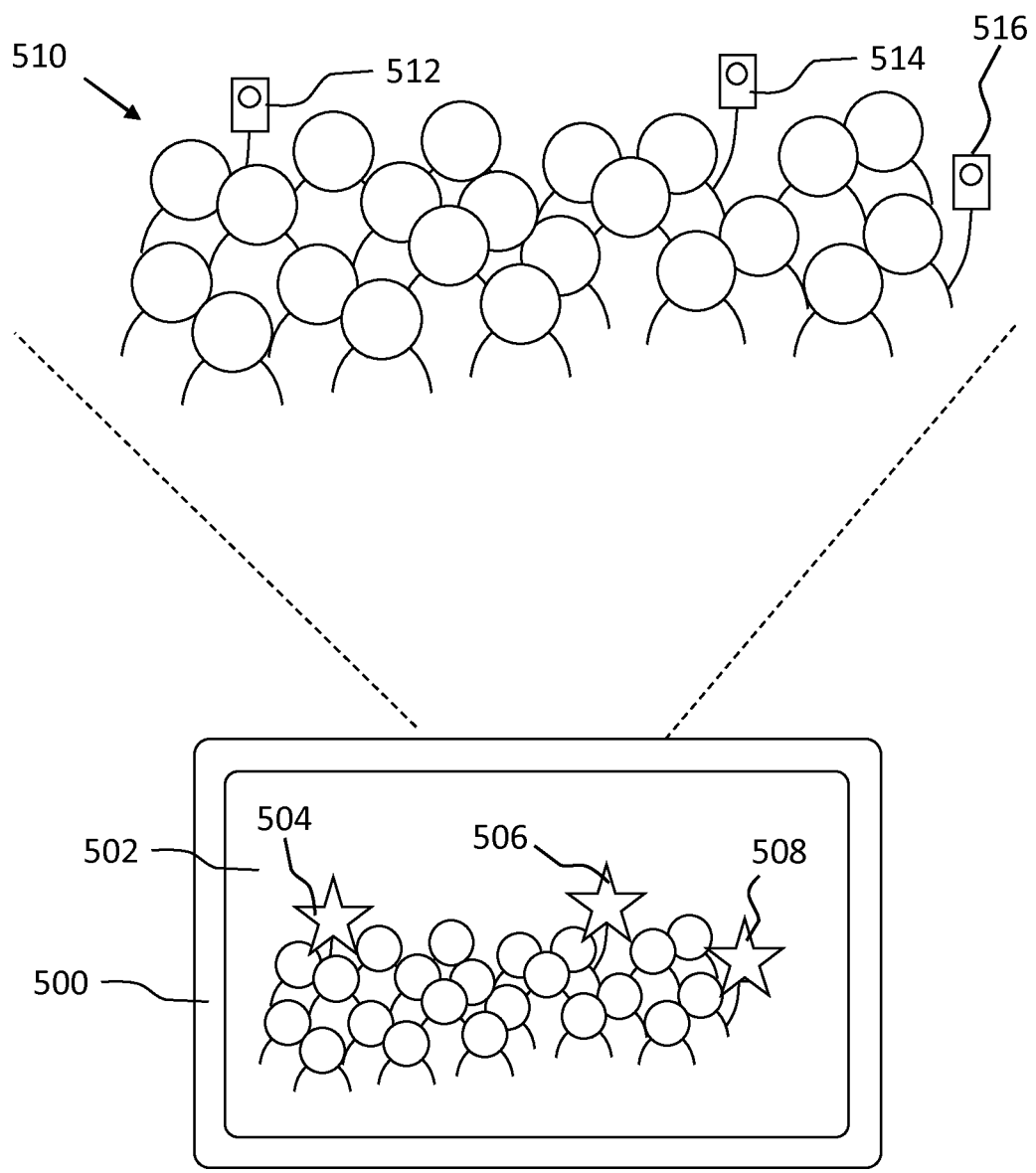
FIG. 5 shows schematically an embodiment of a mobile device according to the invention for displaying a plurality of locations of a plurality of mobile devices.

The processor 114 may be further arranged for retrieving a plurality of codes from the light emitted by a plurality of light sources of a plurality of light emitting mobile devices and for identifying, based on the plurality of codes, the plurality of light emitting mobile devices. The processor 114 may further provide a plurality of indicators indicating the locations of the plurality of light emitting mobile devices. FIG. 5 illustrates an example of a first mobile device 500 for providing a plurality of indicators 504, 506, 508 of a plurality of respective second mobile device 512, 514, 516 in a crowd 510 on a display 502.

The processor 114 is arranged for generating the request message defining a code. The code may be a unique sequence of bits, which sequence may be generated by the first mobile device, or the sequence may be generated by a device remote from the first mobile device. The unique code may, for example, be generated based on the current time, based on an identifier of the first mobile device 100 and/or by any random code generator. Both the first mobile device 100 and the second mobile device may use the same random code generator. Alternatively, the code may be a randomly generated stream of bits generated by a source external to both the first mobile device 100 and the second mobile device. The first mobile device 100 and the second mobile device may both have access to the source so as to drive the light source and retrieve the code accordingly. Both the first mobile device 100 and the second mobile device know which code should be emitted at which time, which enables them to determine the presence of the other. The randomly generated stream of bits is meaningless to devices which have no access to the source.

The processor 114 may be further arranged for embedding additional information in the light emitted by the light source 102, which additional information may be retrieved by a light receiving mobile device. An example of such additional information is an identifier of the light emitting mobile device. This may enable a light receiving mobile device to further identify the light emitting mobile device. Additionally or alternatively, the additional information may comprise location information indicative of the location of the light emitting mobile device. The light emitting mobile device may receive the location information from, for example, an (indoor) positioning system. The location information may for example comprise at least one of: position coordinates, an area identifier, a room identifier, etc. Additionally or alternatively, the additional information may comprise a link to any of the above-mentioned or any other information. The link may be accessible via the internet, via an application running on the light receiving mobile device, etc. It should be noted that the above-mentioned types of additional information are mere examples of additional information and illustrate rather than limit the invention, and that those skilled in the art will be able to design many alternative types of additional information without departing from the scope of the appended claims.

Figure 6:
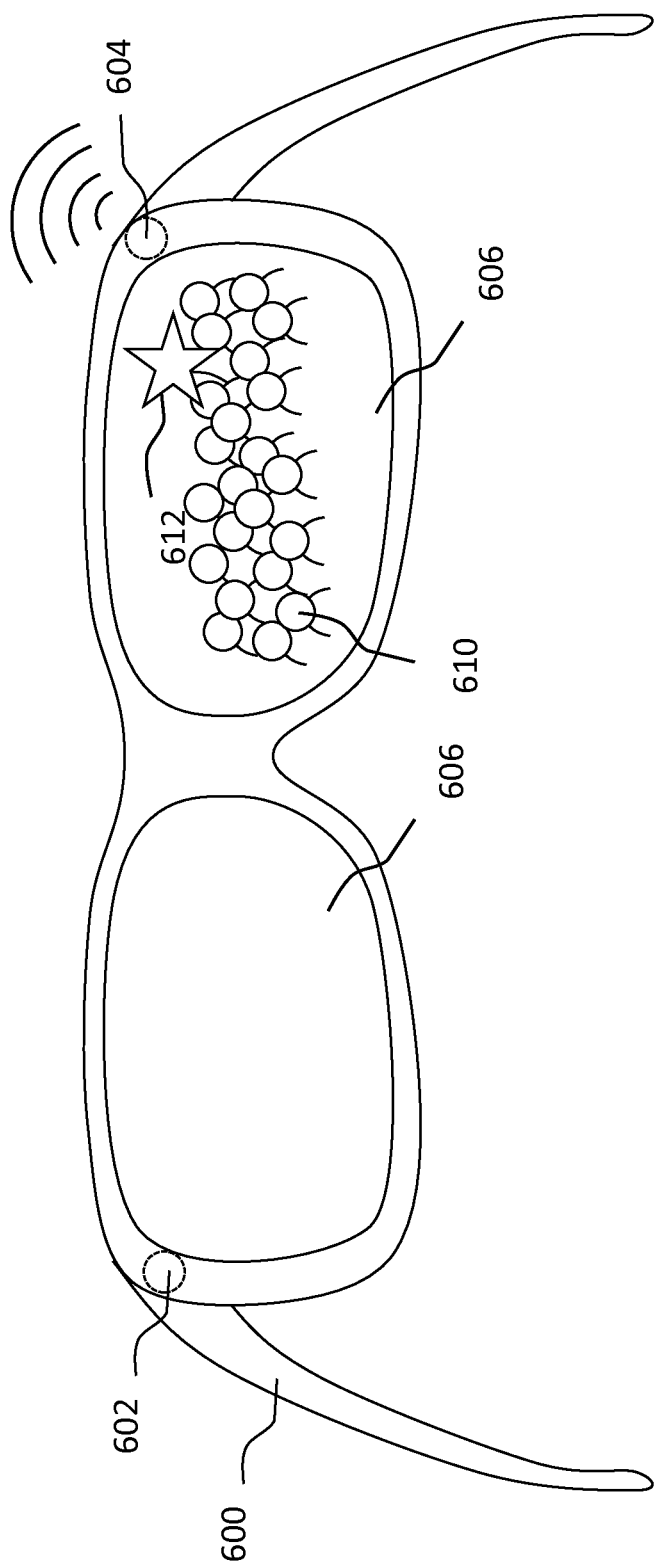
FIG. 6 shows schematically an embodiment of a wearable mobile device according to the invention for displaying a location of another mobile device.

FIG. 6 shows schematically an embodiment of a wearable mobile device 600 according to the invention for displaying a location of another mobile device. The wearable mobile device 600 may be smart glasses or AR/VR glasses comprising a camera 602 and a transmitter 604 for transmitting the request message via, for example, a Radio Frequency (RF) protocol such as Bluetooth, Wi-Fi or ZigBee. The glasses of the wearable mobile device 600 may comprise a display for providing a virtual indicator 612. Alternatively, the virtual indicator may be projected on the glasses of the wearable device 600 or on the retina of the user wearing the wearable device 600. Additionally, a stream of images captured by the camera 602 may be displayed on the glasses or projected on the glasses of the wearable device 600 or on the retina of the user wearing the wearable device 600. The wearable device 600 enables a user to look at the crowd 610 through the glasses 606, and, if a code according to the code of the request message has been detected by the camera, the virtual indicator 612 will provide the location of the person operating the light emitting mobile device.

Figure 7:
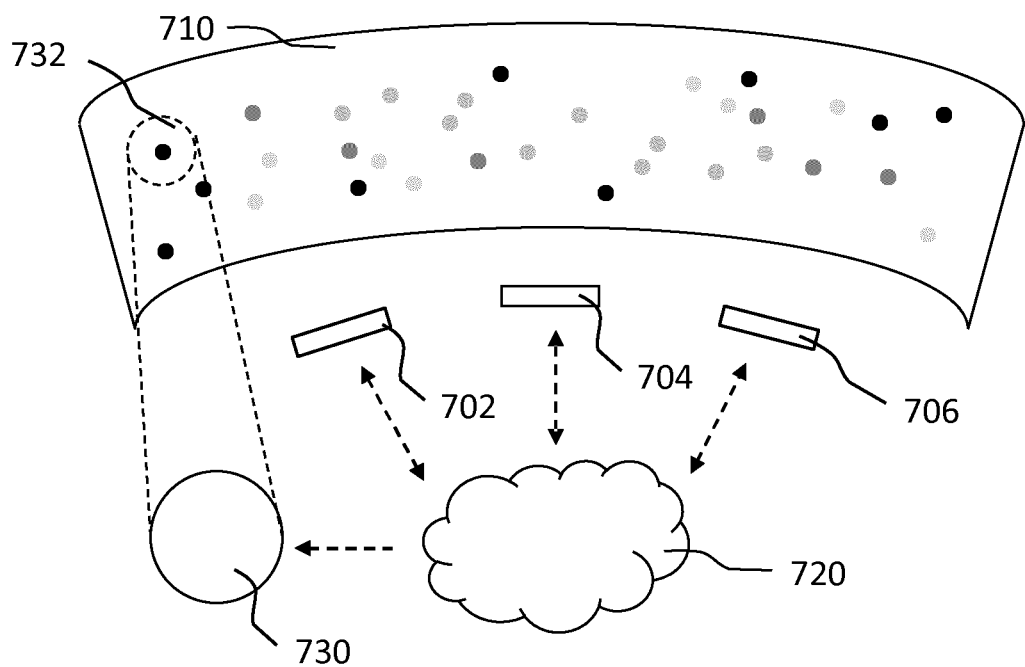
FIG. 7 shows schematically a top view of a plurality of mobile devices according to the invention and an area with multiple other mobile devices which each emit light comprising an embedded code.

FIG. 7 shows schematically a top view of a plurality of mobile devices 702, 704, 706 according to the invention and an area 710 with multiple other mobile devices (the black and grey dots in the area 710) which each emit light comprising an embedded code. The plurality of mobile devices 702, 704, 706 may detect a plurality of codes embedded in the light emitted by the plurality of other mobile devices, and communicate (for example via the internet) information related to the detected codes to a central server 720. The central server 720 may collect the information from the plurality of mobile devices 702, 704, 706, and determine which codes are searched for by each of the plurality of mobile devices 702, 704, 706. If a code matches with a code from one of the request messages emitted by one of the plurality of mobile devices 702, 704, 706, the central server 720 may communicate the location information of the device emitting the code to the respective mobile device. This embodiment provides the advantage that multiple first mobile devices cooperate in order to discover the location of a light emitting mobile device. Additionally, the central server 720 may be connected to a lighting system 730. The central server 720 may be arranged for controlling the lighting system such that one or more lighting devices of the lighting system 730 illuminate the location of a light emitting mobile device 732 that is being searched for by one of the plurality of mobile devices 702, 704, 706.

Figure 8:
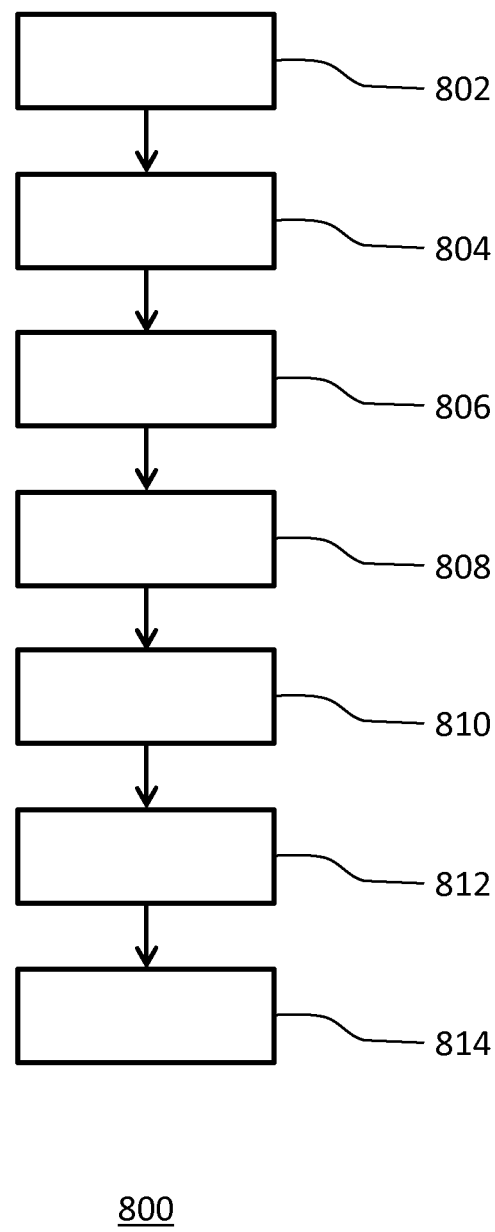
FIG. 8 shows schematically a method according to the invention of locating a mobile device in a group of mobile devices.

FIG. 8 shows schematically a method 800 according to the invention of locating a mobile device in a group of mobile devices. The method comprises the steps of:
 transmitting 802 a request message defining a code,
 receiving 804 the request message, driving 806 a light source of a light emitting mobile device such that it emits light being coded according to the code, detecting 808, by a light receiving mobile device, the light emitted by the light source, retrieving 810 the code from the light, identifying 812 the light emitting mobile device based on the code, and providing 814 an indicator on the light receiving mobile device, the indicator indicating the location of the light emitting mobile device.

In embodiments of the method, the step of transmitting 802 the request message defining the code is executed by the light receiving mobile device, and the step of receiving 804 the request message is executed by the light emitting mobile device.

In embodiments of the method, the step of transmitting 802 the request message defining the code is executed by the light emitting mobile device, and the step of receiving 804 the request message is executed by the light receiving mobile device.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of locating a mobile device, the method comprising:
    transmitting a request message defining a code, by a first mobile device,
    receiving the request message, by a second mobile device,
    driving a light source of a light emitting mobile device such that it emits light being coded according to the code, the light emitting mobile device being one of the first and second mobile devices,
    capturing, by a light receiving mobile device, a stream of images comprising the light emitted by the light source, the light receiving mobile device being the other of the first and second mobile devices,
    retrieving the code from the light in the stream of images, by the light receiving mobile device,
    identifying the light emitting mobile device based on the code, by the light receiving mobile device, and
    displaying the stream of images and an indicator on the light receiving mobile device as an overlay on the stream of images to indicate the location of the light emitting mobile device,
    wherein capturing the stream of images comprises capturing a first stream of images received from a first direction by a first image capture means, and capturing a second stream of images received from a second direction by a second image capture means, wherein the first and/or the second stream of images comprises the light emitted by the light source.

2. The method of claim 1, wherein the light receiving mobile device is the first mobile device and wherein the light emitting mobile device is the second mobile device.

3. The method of claim 1, wherein the light emitting mobile device is the first mobile device and wherein the light receiving mobile device is the second mobile device.

4. The method of claim 1, wherein the code is a unique sequence of bits.

5. The method of claim 1, wherein the code is a randomly generated stream of bits, and wherein the light emitting device and the light receiving device both have access to the generated stream of bits so as to respectively drive the light source and retrieve the code accordingly.

6. The method of claim 1, wherein the request message further comprises color information representative of a color, and wherein the step of driving the light source of the light emitting mobile device comprises driving the light source such that it emits light according to the color.

7. The method of claim 1, wherein the step of driving the light source of the light emitting mobile device further comprises embedding location information indicative of a location of the light emitting mobile device in the code, and wherein the method further comprises the steps of:
    retrieving, by the light receiving device, the location of the light emitting mobile device from the light emitted by the light source, and
    providing the location information on the light receiving device.

8. The method of claim 1, wherein step of driving the light source comprises driving a plurality of light sources oriented in different directions.

9. The method of claim 1, wherein the request message is transmitted via a radio frequency protocol.

10. The method of claim 1, wherein the light is visible to the human eye.

11. The method of claim 1, further comprising the steps of:
    retrieving a plurality of codes from the light emitted by a plurality of light sources of a plurality of light emitting mobile devices,
    identifying, based on the plurality of codes, the plurality of light emitting mobile devices, and
    providing a plurality of indicators indicating the locations of the plurality of light emitting mobile devices.

12. A first mobile device for locating a second mobile device, comprising:
    a first light source,
    a driver for driving the light source,
    a transmitter for transmitting a primary request message to the second mobile device,
    a receiver for receiving a secondary request message transmitted by the second mobile device,
    a camera arranged for capturing a stream of images,
    a processor for:
        a. generating the primary request message defining a code,
        b. transmitting the primary request message via the transmitter,
        c. detecting light emitted by a second light source of the second mobile device via the camera,
        d. retrieving the code from the detected light in the stream of images,
        e. identifying the second mobile device based on the code, f. displaying the stream of images and an indicator as an overlay on the stream of images to indicate a location of the second mobile device, g. controlling the driver such that the light source emits light being coded according to the code, wherein the processor is arranged for activating:

(i) a first operational mode, wherein the processor executes either steps a-f or steps a, b and g, and (ii) a second operational mode, wherein, upon receiving the secondary request message, the processor executes either step g or steps c-f, respectively.

* * * * *